United States Patent [19]

Saibic

[11] Patent Number: 4,713,170
[45] Date of Patent: Dec. 15, 1987

[54] SWIMMING POOL WATER PURIFIER

[75] Inventor: Darryl S. Saibic, Plantation, Fla.

[73] Assignee: Florida Development and Manufacturing, Inc., Deerfield Beach, Fla.

[21] Appl. No.: 846,308

[22] Filed: Mar. 31, 1986

[51] Int. Cl.⁴ .......................... C25B 9/04; C25B 15/00
[52] U.S. Cl. ..................................... 210/85; 210/169; 210/243; 210/232; 204/228
[58] Field of Search ................. 210/85, 143, 149, 169, 210/192, 205, 206, 232, 243, 742, 746, 748; 204/228, 272, 275, 302, 305

[56] References Cited

U.S. PATENT DOCUMENTS

| | | | |
|---|---|---|---|
| 2,490,730 | 12/1949 | Dubilier | 204/272 |
| 3,095,365 | 6/1963 | Green | 204/229 |
| 3,223,242 | 12/1965 | Murray | 210/192 |
| 3,336,220 | 8/1967 | Neidl | 210/243 |
| 3,751,355 | 8/1973 | Mandroian | 204/228 |
| 3,841,483 | 10/1974 | Overton | 210/243 |
| 4,033,871 | 7/1977 | Wall | 210/169 |
| 4,039,422 | 8/1977 | Packer | 204/272 |
| 4,119,518 | 10/1978 | Miller | 204/272 |
| 4,269,690 | 5/1981 | Graham III | 204/275 |
| 4,379,043 | 4/1983 | Chappelle | 204/272 |
| 4,525,253 | 6/1985 | Hayes et al. | 204/228 |
| 4,525,272 | 6/1985 | Henson | 210/149 |

FOREIGN PATENT DOCUMENTS 0133920  3/1985  European Pat. Off. ........... 210/746

OTHER PUBLICATIONS

Ster-O-Lizer Advertisement, 2/17/86, *Electronic Engineering Times*, p. 63.
Crystak Pool Chlorine Saver, Mail Order Advertisement.

*Primary Examiner*—Richard V. Fisher
*Assistant Examiner*—Linda S. Evans
*Attorney, Agent, or Firm*—Jerry A. Miller

[57] ABSTRACT

An apparatus for purifying swimming pool water and inhibiting the growth of algae therein includes a substantially T-Shaped hollow pipe fitting having first and second opposing openings and a central opening subtantially normal to the first and second openings. The first opening is for receiving a flow of water and the second opening is for discharging the flow of water. A pressure fitting is coupled to and seals the central opening by a screw connection. An electrical anode, having cylindrical shape and consisting essentially of copper has a first major axis along the length of the cylindrical shape and is coupled to the pressure fitting and situated within the pipe fitting with its first major axis approximately normal to the flow of water. An electrical cathode assembly of four rods is disposed symmetrically about the anode. The cathode assembly is disposed adjacent the anode. A controller circuit applies an electrical current between the anode and cathode. A temperature sensor is coupled to the anode. A display displays a figure of merit relating to the current as a function of temperature. A control enables adjustment of the current so that another display reads the same as the first display.

11 Claims, 5 Drawing Figures

United States Patent Office

PTO - BOYERS, PA Duty Station

MISSING PAGE TEMPORARY NOTICE

PATENT # 4713170    FOR ISSUE DATE 12-15-1987

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 3

Data Conversion Operation
Boyers, Pa

SWIMMING POOL WATER PURIFIER

CROSS REFERENCE TO RELATED APPLICATIONS

This application is related to a copending patent application Ser. No. 846,234 entitled "Electrode Assembly For Water Purifier", having a common inventor of Darryl S. Saibic and filed simultaneously herewith. The content of said copending application is hereby incorporated by reference as though disclosed fully herein.

BACKGROUND OF THE INVENTION

1. FIELD OF THE INVENTION

This invention relates generally to the field of water purification devices and methods. More particularly, this invention relates to electro-chemical water purification devices particularly suited to treatment of swimming pool or spa water.

2. BACKGROUND

This invention purifies water by utilizing electrolysis to introduce copper ions into the water thereby inhibiting the growth of algae, fungi and bacteria. Such water purification techniques have many advantages, not the least of which is a substantial reduction in the need for addition of chemicals to swimming pool water thereby reducing the cost of operating a swimming pool. It also reduces the need for handling of, use of and exposure to liquid, granulated or gaseous chlorine products. While some degree of disinfectant action by chlorine or equivalents should still be used, the cost of such chemicals may be radically reduced with the present invention. In addition to the above advantages, the method and apparatus of the present invention allows for use of such electrolytic purification of the water while eliminating the need for drainage of the swimming pool to remove stabilizer from the water.

In U.S. Pat. No. 4,525,272 to Henson, an electrolytic water treatment apparatus is disclosed an embodiment of which is marketed by Swimaid, Inc. under the name "Challenger" (TM). This exemplary apparatus utilizes a cylindrical copper anode surrounded by a galvanized wire mesh cathode. The housing is fabricated to allow for a quick connection and disconnection from the pool filteration system and allows for quick replacement of the anode-cathode assembly by utilizing a standard plumbing sanitary T drain pipe fitting as the housing with the anode-cathode assembly installed on a plug cap having a connector designed to mate with those of the housing.

This arrangement has several drawbacks which are at least partially circumvented by the present invention. Not the least of these drawbacks is that the quick connect latches used in that design do not alone produce an adequate seal against leaks. Thus, rubber O-Rings are required to adequately seal the system. Such O-Rings are prone to fatigue which may ultimately result in leaks in the system. Also, depending upon the exact plumbing arrangement of the pool's filtration system, such quick connect latches are known to fail or disconnect upon receipt of the initial impact of water resulting when the pump of the filter system is initially turned on. Clearly this is an undesirable condition which can risk complete drainage of the pool within a few hours or possible loss of prime by the pump resulting in costly damage to the pump and/or refilling and conditioning of the pool water.

In addition, the water purifier disclosed in the above patent is only capable of operating over a narrow range of resistivity of water. While exact resistivity tests have not been done in the course of development of the present invention, it appears that the resistivity of water is roughly halved when a typical level of 30 to 100 ppm of cyanuric acid is present in the pool water. As such, swimming pools containing stabilizers such as Cyanuric Acid are unable to utilize that device. The electrical control circuitry of the above device has been observed to rapidly and frequently fail if used in swimming pools containing cyanuric acid. Since some amount of chlorine is practically a necessity in maintaining safe pool water, this limitation in the above device is a severe disadvantage. Those skilled in the art will recognize that cyanuric acid provides stabilization of chlorine thereby substantially slowing down the breakdown of chlorine by sunlight, etc. By requiring that the swimming pool be purged of cyanuric acid (by drainage of all pool water and refilling) the initial expense of installation of that device as well as inconvenience and risk of damage to the pool by drainage is increased. Furthermore, since all cyanuric acid must be purged from the pool, the amount and frequency with which chlorine products must be added to the pool are significantly increased thereby substantially reducing the convenience and economic advantage of using copper electrolysis to assist in the purifying process.

The above limitation also leads to a more costly and and possibly extended break-in period for the pool water after installation of the device. Since the pool must be drained and refilled as part of the installation process, and since cyanuric acid (or other subtances affecting the resistivity of the water) must not be introduced into the pool, large quantities of chlorine products may be required over a one to two month period while waiting for the level of copper to reach an effective level.

A further disadvantage of the above device is that its design (and indeed the teaching of the patent) requires that the water enter a side entrance to the housing where it is forced to abruptly change directions to produce a degree of turbulence to enhance the electrolytic activity. In so doing, the use of that device is limited to circumstances where adequate room is available for the various bends in pipe and other adaptation to the plumbing needed to effect such a change in direction. Such needs may have detrimental effects on the available water pressure when PVC pipe is used due to it's high friction with water. While this is generally not a serious drawback, the requirement for a direction change can make initial installation difficult and can become an additional consideration or cost in systems having solar heating equipment, automatic cleaners and other devices which require high water pressure to properly function. It can also become important in situations where only limited space for installation of such a device is possible.

The present invention relieves these and other shortcomings in the art with a novel water purifier having a simplified design which results in low cost assembly and more versatile performance as described in detail below.

SUMMARY OF THE INVENTION

Accordingly, it is an object of the present invention to provide an improved water purifier.

It is another object of the present invention to provide a water purifier which can operate in the presence or absence of water treated with cyanuric acid and other substances which affect the resistivity of the water.

It is another object of the present invention to provide a compact water purifier which can be readily installed in a small space without requiring a change in water direction.

It is another object of the present invention to provide a water purifier which can be installed without drainage of the swimming pool.

It is also an object of the present invention to provide an improved electro-chemical water purifier which has reduced break-in cost as a result of the ability to function in the presence of low resistivity water.

It is another object of the present invention to provide an improved water purification apparatus which exhibits rugged construction which has improved immunity to leaks and which needs no large O-Rings to effect a water seal.

It is also an object of this invention to provide a replaceable anode-cathode assembly for use in an electrolytic water purifier in accord with the present water purifier.

It is another object of the present invention to provide an improved method for conditioning and breaking in the water of a swimming pool for use of an electrolytic water purifier.

It is a further object of the present invention to provide a water purifier which overcomes the disadvantages present in other such devices.

In one embodiment of the present invention an improved electro-chemical apparatus for purifying swimming pool water and inhibiting the growth of algae therein includes a substantially T-Shaped hollow pipe fitting having first and second opposing openings and a central opening substantially normal to the first and second openings, the first opening being suitable for receiving a flow of water and the second opening being suitable for discharging the flow of water. A pressure fitting is coupled to and seals the central opening. An electrical anode, consisting essentially of copper and having a first major axis, is coupled to the pressure fitting and situated within the pipe fitting with the first major axis approximately normal to the flow of water. An electrical cathode having a second major axis, is disposed adjacent the anode with the second major axis approximately parallel to the first major axis. An electrical circuit applies an electrical current between the anode and the cathode.

In another embodiment of the present invention, an improved method of purifying water for a swimming pool during a period of transition to a purification system utilizing copper electrolysis for purifying said water, includes the steps of:

establishing or maintaining a concentration of chlorine stabilizer in the water suitable for inhibiting breakdown of chlorine in the water;

applying a first electrical current between an anode consisting essentially of copper and a cathode to initiate copper electrolysis;

monitoring the level of copper trisulphate in the water at approximately weekly intervals to determine the level of copper in the water; and adding decreasing amounts of chlorine to the water for approximately 4 weeks to maintain a concentration of at least 1.0 to 1.5 PPM of chlorine during the first week decreasing to approximately 0.2 to 0.5 PPM of chlorine when the copper trisulphate level reaches approximately 0.2 to 0.4 PPM. Preferably, a sequestering agent is also used to keep the copper suspended in the water.

These and other objects, features, and advantages of the invention will become apparent to those skilled in the art upon consideration of the following detailed description taken in conjunction with the accompanying drawings.

BRIEF DESCRIPTION OF THE DRAWINGS

FIG. 3 is a conceptualized block diagram of an embodiment of the controller circuitry of the present invention.

DETAILED DESCRIPTION OF THE INVENTION

Figure 1:
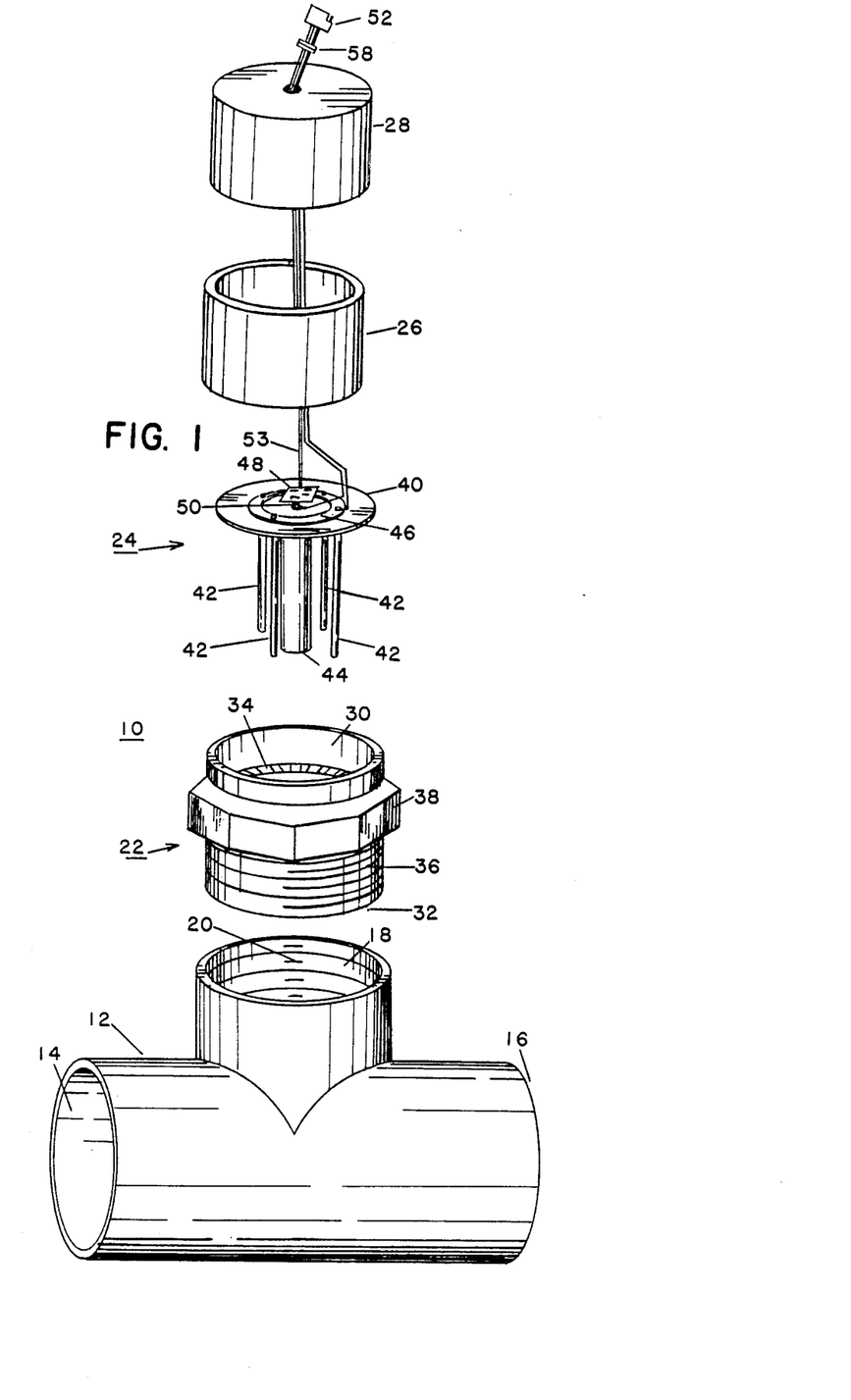
FIG. 1 is an exploded mechanical view of the main mechanical assembly of the housing of the present invention.

Turning now to the drawings wherein like reference numerals designate identical or corresponding parts throughout the several views, and more particularly to FIG. 1 thereof, the main housing assembly is shown in an exploded view and designated generally as 10. A PVC (PolyVinyl Chloride) T-fitting is used as a housing 12 for containing the anode-cathode electrode assembly of the present invention. In the preferred embodiment, a standard commercially available 3½ inch (inner diameter) T-fitting of schedule 40 PVC is used for housing 12. A first opening 14 is used as an inlet for the flow of pool water to be processed and an opening 16 serves as a discharge for processed water so that water being treated passes through the housng in a linear manner from opening 14 to 16. This allows for minimal friction on the flow of water and also creates a compact assembly which is easily plumbed into most existing pool systems.

Openings 14 and 16 are situated on opposite ends of the housing 12. Openings 14 and 16 are preferably standard female PVC fittings which may be coupled in to the pool's plumbing by standard commercially available PVC cement and couplings as are commonly used in the plumbing art. However, in some applications, it may be appropriate to provide screw couplings at openings 14 and 16.

A central opening 18 is provided at a normal angle with the flow of water from 14 to 16 in a cental area of the housing. Opening 18 is provided with female threads 20 in order to accommodate installation of an anode-cathode electrode assembly made up of a pressure fitting 22, an platform 24, a sleeve 26 and an end cap 28.

Pressure fitting 22 is a standard commercially available schedule 40 PVC pressure fitting having a 3½ inch inner diameter opening at its upper end 30. The inner diameter is reduced to approximately 2⅜ inches at lower end 32. The diameter reduction occurs at a beveled surface 34 and it should be carefully noted that this beveled surface is preferably a very sharp 90 degree bevel so that a water tight seal with platform assembly 24 using standard PVC cement or RTV Silicon Caulking may be readily achieved. Fabrication of the anode-cathode electrode assembly using a standard DWV fitting for pressure fitting 22 is possible but tests have indicated that it is likely to result in inconsistent fabrication characterized by difficulty in obtaining a water tight seal due to the tapered bevel on this type of fitting.

Pressure fitting 22 includes male threads 36 appropriately dimensioned to mate with female threads 20 of housing 12. Also, pressure fitting 22 preferrably includes a bolt-like octagonal array of flattened surfaces 38 to facilitate secure screwing into housing 12. When securely screwed into central opening 18, pressure fitting 22 provides a water tight seal without use of O-Rings. It is, however, generally desirable to use a grease or pipe thread compound or Teflon (TM) tape between the male and female threads to assure a proper water tight seal.

Figure 2:
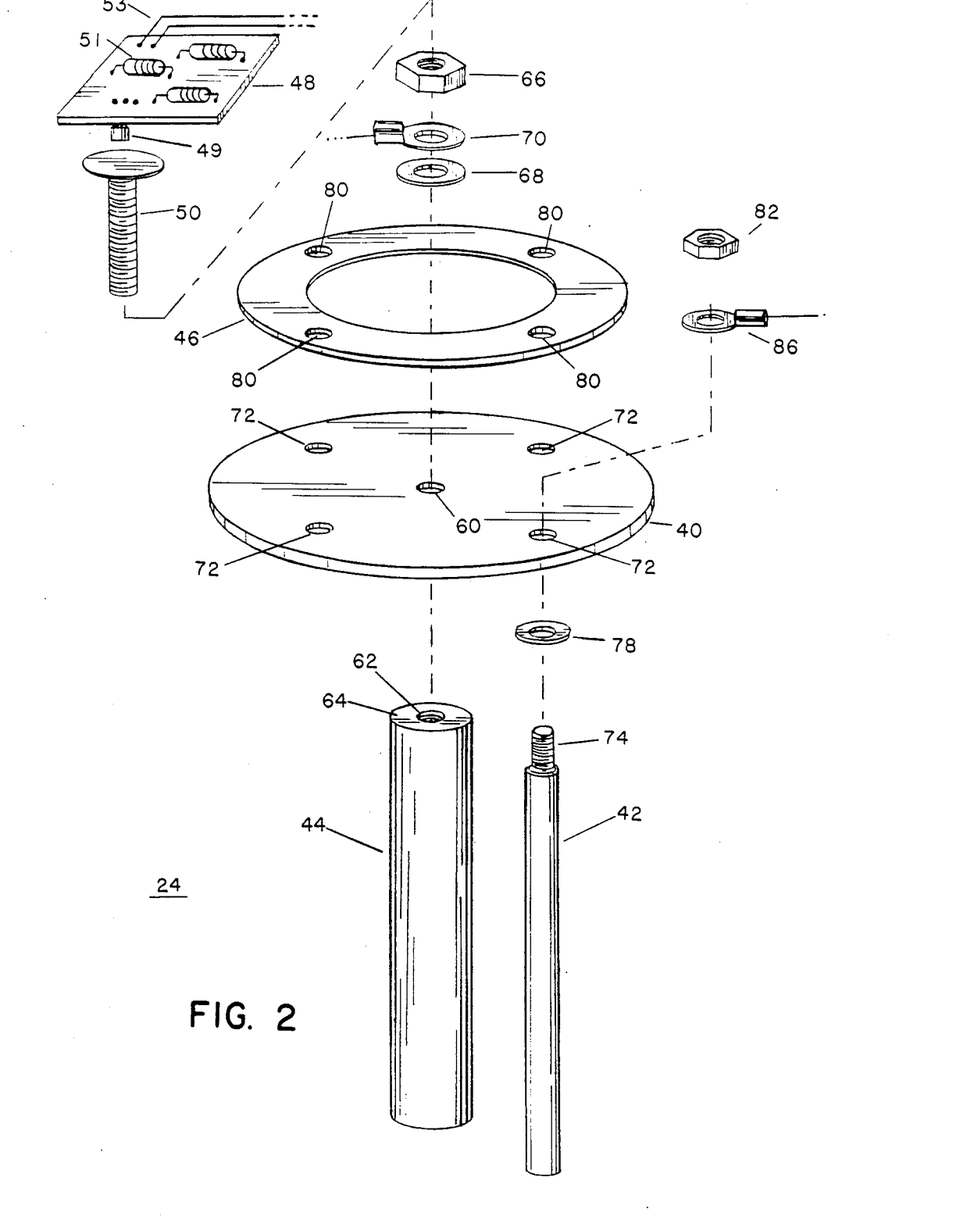
FIG. 2 is an exploded mechanical view of the platform assembly of the replaceable anode-cathode assembly of the present invention.

Platform assembly 24 is shown in greater detail in FIG. 2 but is described generally in conjunction with FIG. 1 as follows. Platform assembly 24 includes a PVC disk 40 having diameter slightly smaller than that of the upper end of pressure fitting 22 so that it may be easily inserted into the upper opening thereof and rest upon bevel 34 where it is secured in place and sealed by PVC cement or silicon caulking. Platform assembly 24 includes a plurality of cathode rods 42 disposed about a central anode rod 44 all of which are attached to disk 40. Rods 42 are electrically coupled together via connection ring 46. An electrical temperature sensor board 48 is coupled to anode 44 via an epoxy connection to a screw 50. Wire 53 from the connecting ring, the anode rod and the temperature sensor board 48 are coupled to a connector 52 which mates with a mating connector external to the assembly. A horseshoe shaped element may be substituted for connecting ring 46.

After installation of platform assembly 40 into pressure fitting 22, sleeve 26 is inserted and cemented into place. In order to achieve a secure water seal, sleeve 26 preferably has a straight lower edge so that even pressure is applied to the disk 40 when the sleeve is cemented into place. Sleeve 26 is preferably a 2¼ to 3 inch length of PVC which is used to facilitate attachment of end cap 28. End cap 28 has a small hole in its top for passage of wiring. A strain relief 58 is used to seal the hole on the end cap and relieve strain from internal joints.

Assembly of the above anode-cathode assembly is preferably effected using PVC cement and silicon caulking such as that manufactured by General Electric (TM) as described above due to the ease of working with PVC and relative strength, durability and ease of obtaining a watertight seal. However, it should be noted that other techniques may be used to create the above assembly without departing from the spirit of the invention.

The platform assembly is shown in greater detail in FIG. 2 and is assembled generally as follows. Disk 40 includes a central aperture 60 having slightly greater diameter than that of a threaded hole 62 in an upper end 64 of anode 44. Anode 44 consists essentially of copper and is preferably at least 98 percent copper by weight. Anode 44 is approximately 5½ inches long and 1¼ inches in diameter. In the preferred embodiment, a 99.9 percent pure electrolytic copper rod is used, but it is also possible to use compositions including small amounts of silver to obtain the sterilizing effects of silver ions in the water without departing from the present invention.

Anode 44 is connected to disk 40 by screw connection to screw 50 (which is preferably copper or brass for good heat transmission and compatibility with the copper anode) and is secured into place with a lock-nut 66 and washer 68. An electrical connector 70 is used to attach a wire to the anode to allow for electrical contact thereto. In one embodiment, silicone caulking is used to effect a water seal between anode 44 and disk 40 but this is not to be limiting as a variety of known water sealing arrangements may be used such as gasket seals and O-Ring seals. Temperature sensor board 48 includes a temperature sensing transistor 49, which is preferably a TO-92 packaged transistor, attached to the flat surface at the top of the screw 50 using epoxy so that the temperature of the water may be measured using anode 44 as a probe. In the preferred embodiment a transistor is used as a temperature sensor but other circuit elements may also be used. Of course, cathode 42 may similarly be used as a probe in alternative embodiments. Temperature sensor board 48 may also be used to carry various other circuit components such as resistors 51 which are used to provide bias to transistor 49 and are desirably at approximately the same temperature as transistor 49.

Disk 40 also includes a plurality of holes 72 disposed about central aperture 60 for receiving a threaded portion 74 of cathode rods 42. For purposes of FIG. 2, only one of cathode rods 42 are shown but this is merely to simplify the drawing. Preferably four rods 42 serve as cathodes and are disposed equidistant about anode 44. Cathode rods 42 are separated from anode rod 44 by a distance of approximately ⅜ of an inch but this is not to be limiting. Cathode rods 42 are attached to disk 40 so that the major axis of the rods are approximately parallel to the major axis of the anode.

Cathode rods 42 are preferably about #10 gauge made of 1010 electro-zinc plated steel rod stock and include approximately one inch of 10–32 threads at one end for ease of assembly. The threaded end of rods 42 are slightly smaller in diameter than the remainder of the rod facilitating use of a washer 78 abutting the transition from threaded area to rod to serve as a stop to prevent rod 42 from passing through hole 72. Water sealing may be accomplished in a manner similar to that of anode 44 by using silicone caulking or gaskets or the like. If more than one rod is used for a cathode, they may be connected electrically by connecting ring 46 having holes 80 corresponding to the holes 72 of disk 40. Connecting ring 41 may be made by stamping it from cold rolled 1010 steel or other known processes. It is also possible to connect rods 42 by using wire connectors attached to each of the ends of the rods but this is a less desirable arrangement since it requires more parts and labor and may result in less reliable connections.

The threaded ends 74 of rods 42 are secured to the disk 40 and the connecting ring 46 by a nut 82. A washer may also be used on the upper side of disk 40 if desired. One of the rods is also connected to an electrical connector 86 as shown to facilitate electrical connection to the cathodes. In the arrangement described, the cathode rods 42 are effectively connected in parallel. By using a plurality of relatively thin rods, the amount of disturbance to the water flow may be minimized while allowing for symmetrical reduction in the size of the relatively large anode as the copper is absorbed by the water. While in general, the present anode-cathode assembly is intended for one time use of approximately 1-1½ years before replacement is required, those skilled in the art may readily adapt the present design to facilitate replacement of the anode without need to discard the entire assembly.

The above assembly may be readily plumbed into an existing pool filter system with a minimum of difficulty and requires only about one foot of straight pipe to be accessible for replacement by the present apparatus. As such, it is feasible to install the present invention in virtually all pool systems without need for extensive replumbing. The straight through design for water passage relies upon maximum water flow over substantial portions of the anode and cathode to effect efficient electrolytic release of the copper ions. In operation, electrical current passes between anode 44 and cathodes 42 causing release of copper ions into the water to effect an antibacterial and algae/fungus killing action. Over a period of time, a thin coating of copper will form on the walls of cement composition pools which very effectively inhibits growth of even black algae on the walls of the pool.

The electrical current which drives the anode-cathode assembly is provided by the controller circuitry shown in FIG. 3. This controller circuit is wired into the electrical supply for the pool system's pump so that the water purifier is only on during periods when the pump is running. It is advisable to install the purifier on the outlet side of the pump and filter so that gas bubbles which are formed on the cathode rods are pumped directly into the pool and thereby do not accumulate in the filter system. The pump (and therefore the purifier) should be operated approximately 3 to 6 hours per day for the above approximates to be correct. Those familiar with chemical treatment of pool water will appreciate that some degree of experimentation will be required to determine exactly what works in any particular pool and a wide range of possible values should be assumed.

Turning now to FIG. 3, a block diagram of the circuitry 100 of the present invention includes a transistor amplifier 102 which is mechanically attached to the anode 44 as designated by the broken arrow. Amplifier 102 is situated on circuit board 48 so that the transistor is kept at approximately the water temperature. The amplifier 102 is coupled to an IC linear sense circuit 104 which processes the temperature changes detected by changes in characteristics in the transistor amplifier 102 and drives an A/D converter 105. The digital output of A/D converter 105 is received by a microcomputer 106.

Microcomputer 106 computes a number from the digital output of A/D 105 which is indicative of an appropriate voltage or current level for application to the anode and cathode. This number is applied to D/A/ Display Driver 108 which in turn drives a bar graph LED display 110 to provide an adjustment level indication to the user. The output of the display may be further adjusted by a potentiometer 112 which is used to compensate for water resistivity abnormalities from, for example, stabilizer in the water.

Microcomputer 106 also drives D/A 114 which in turn drives a temperature display 116 which displays the water temperature for the user's reference. The water temperature may be selectively displayed either in Centigrade or Farenheit as desired by the user by appropriate selection by switch 118.

Voltage is supplied to anode 44 via an adjustable supply 120 which includes a potentiometer 122 for adjusting its output. The cathode 42 is connected to a resistor 124 and to D/A/ Display Driver 126. A measure of the current between anode and cathode is taken by measuring the voltage at the cathode across resistor 124. This measure is displayed as an output on the bar graph LED display 128. A potentiometer 130 may be used also to adjust the output to compensate for variations such as stabilizer. Those skilled in the art will recognize many variations in providing the circuit functions of the present invention without departing from the present invention. For example, purely analog circuitry may be implemented and other forms of temperature detection and display may be used.

Figure 4:
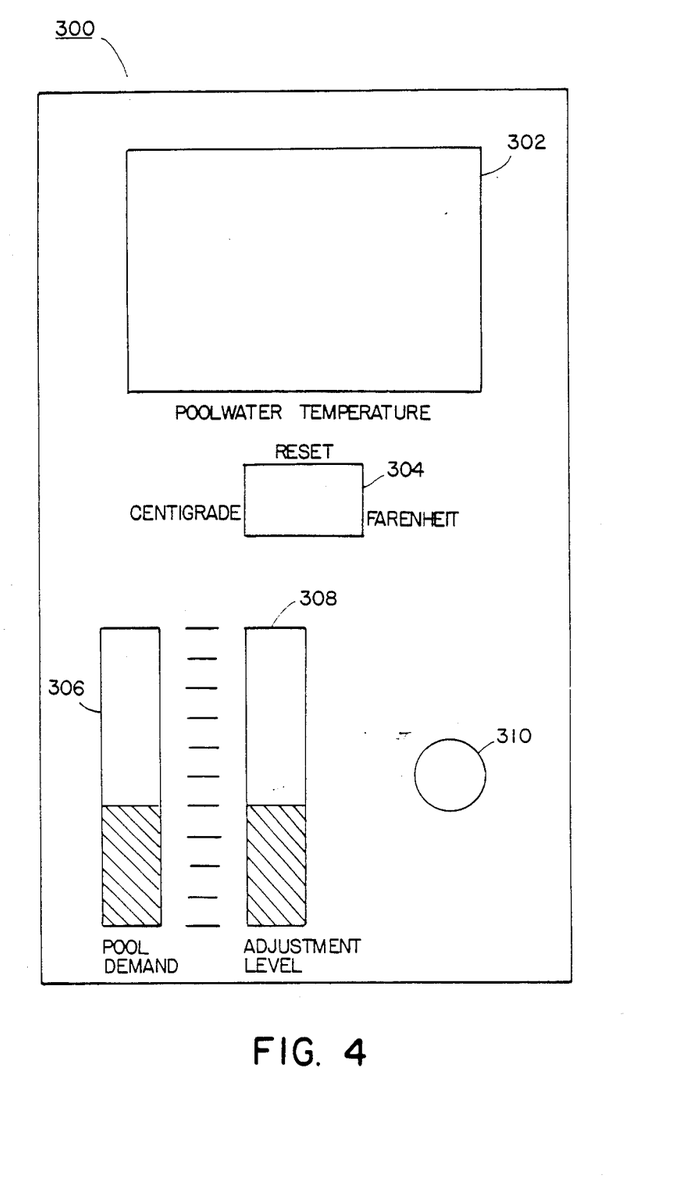
FIG. 4 is a diagram of the layout of the preferred control panel for the controller of the present invention.

The controller of FIG. 3 is sealed within a waterproof enclosure in the preferred embodiment to allow for mounting the controller to an exterior wall if desired. The controller has a control panel 300 shown in FIG. 4. Of course, the exact layout and display arrangement shown in FIG. 4 is not to be limiting but provides for ease of adjustment of the present invention.

Control panel 300 preferably includes a temperature display 302 (corresponding to display 116 of FIG. 3) for displaying the water temperature which is a variable in determining the proper operational current of the present invention. Display 302 may be either a liquid crystal display (LCD) or a light emitting diode (LED) display or other suitable type of display as will be appreciate by those skilled in the art. The display is selectable between reading in Farenheit or Celsius with selector switch 304 (corresponding to switch 118 of FIG. 3).

A first bar graph 306 (110 of FIG. 3) displays a figure of merit indicative of an appropriate current passing between the anode and the cathode in the form of a lighted bar. The figure of merit is dependent upon the temperature of the water as discussed in connection with the circuit operation and is a measure of copper demand since higher temperatures are better suited to algae and bacteria growth thus requiring more copper to combat. A second bar graph 308 (128 of FIG. 3) is controlled by control knob 310 (coupled to potentiometer 122 of FIG. 3) and is adjusted by the user to produce an equal reading on graph 308 as that on graph 306 in order to properly adjust the level of electrolytic production of copper ions in the pool water.

The readings on the bar graphs do not need to take on specific meaning to the user in order to allow proper adjustment of the apparatus. They are related to the actual current in the pool approximately as follows. During the break in period, full current is desired to rapidly increase the copper concentration in the water. Once the break-in period has been passed, the user has merely to occasionally note the readings of the two bar graphs. If the two do not show the same level, control knob 310 is adjusted until they produce the same reading. The user therefore does not need to know the significance of the displays but merely has to match the two readings in order to achieve proper operation of the water purifier. Of course, some experimentation is required to achieve optimal performance in any particular environment due to the highly variable nature of conditions in a swimming pool. In general, this is true with most any swimming pool as will be appreciated by those skilled in the art.

During the break-in period for the water, the copper concentration is gradually building up to an effective level (approximately 0.2 to 0.4 parts per million (PPM) as measured by a standard copper trisulphate measurement on a sample of the pool water); a regiment of chlorine treatment is preferred to maintain good water quality. For a 20,000 gallon pool, the following four to five week break-in is generally found to be appropriate. Of course, varying weather and water conditions may necessitate minor modification to this regiment.

The following amounts of Calcium Hypochlorite should be added to the water (preferably at the pool skimmer). During the first week, 6 ounces should be added three times at approximately equal time intervals. During the second and third weeks, 5 ounces should be added twice. During the fourth week, 3 ounces should be added twice. From the fifth week on, 3 ounces per week should be added. It is also advisable to add approximately 6 ounces per 10,000 gallons of water every 6 to 8 weeks as a shock treatment. It should be understood that these amounts are dependent upon the temperature and use of the pool and may vary according to those conditions. In general, these amounts are satisfactory to maintain a clean pool of 20,000 gallons which sees typical home use in South Forida.

The above regiment may also be modified by using other commonly available chlorine compounds. An approximate conversion for the most common compounds is as follows:

1.5 ounces Calcium Hypo=1.0 ounce Tri-Chlor= =1.5 ounces Dichlor=8.0 ounces Sodium Hypochlorite (10% liquid).

Essentially, the above break-in period sets the chlorine level at approximately 1¼ PPM in the first week and gradually reduces the concentration to a maintenance level of about 0.2 to 0.5 PPM thereafter with an occasional shock treatment being advisable. This should be contrasted with typical manufacturer's recommendations for such products which advise approximately 8 ounces every other day to maintain a 1.0 to 3.0 PPM chlorine level and 20 ounces every week as a shock treatment for a typical 20,000 gallon pool.

During the above break-in period, water should be carefully checked at least weekly for copper trisulfate which is a good indicator of the effective level of copper in the water. During the break-in period, the controller is adjusted to a relatively high level to provide approximately 250 milliamps of current so that the concentration of copper ions in the water is relatively quickly elevated to an effective level. When a level of approximately 0.2 to 0.4 PPM is attained, the water can be considered broken in and the controller can be adjusted to a generally lower level of current (usually between 50 and 200 ma) according to the water temperature to maintain the proper copper level in the water.

Figure 5:
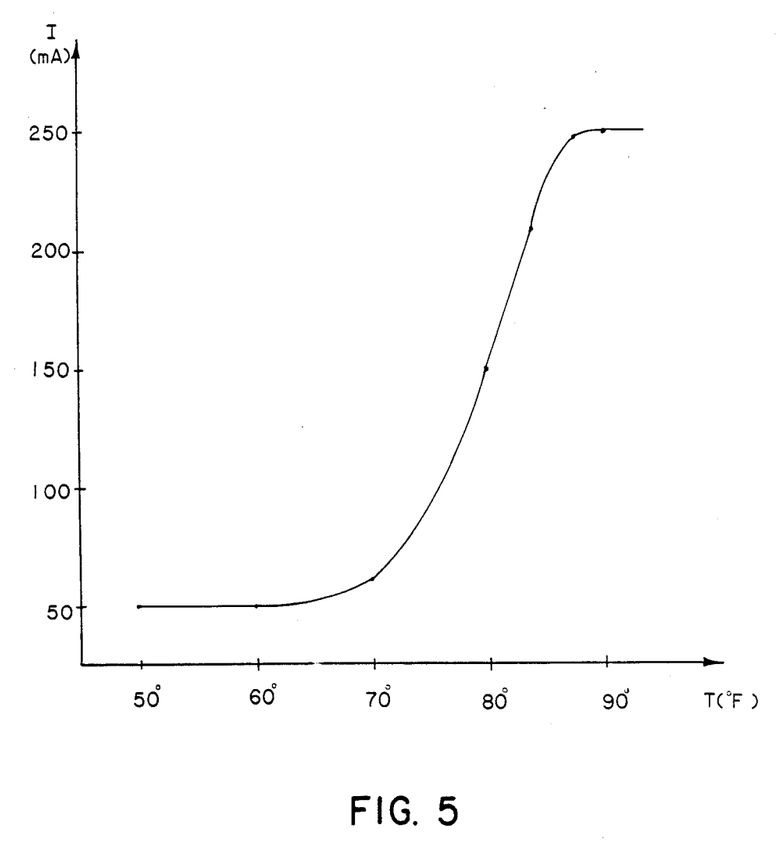
FIG. 5 is a graph of approximate desirable current at the electrodes versus temperature.

FIG. 5 shows a graph of approximate current versus temperature which should be followed for a 20,000 gallon pool to maintain an effective level of copper. These levels are determined empirically by the need for more copper at higher temperatures because of increased growth of algae bacteria and fungus at higher temperatures. Controller 100 is designed and adjusted to approximately provide these relative current levels when properly installed. It should be understood, however, that these currents are only approximate and may require significant adjustment depending upon pool usage, weather, etc. Such variations may usually be accommodated by adjustment of potentiometers 112 and 130. By setting the current control 310 as described above, the currents shown on the graph of FIG. 5 are those which are approximately set without regard for the presence or absence of stabilizer in the water. The upper limit of current is approximately 250 to 300 ma and the lower limit is approximately 35 to 50 ma.

It is also desirable when using the present invention, to add and maintain an operative level of a sequestering agent within the pool water during and after the installation of the present invention although this is not absolutely necessary. The use of such agents can prevent the normal bluish cast of the water due to the presence of copper from producing undesirable uneven stains on marcite pool walls. An even tinting of such walls is normal following installation of the present invention when appropriate sequestering agents are used. Such sequestering agents are widely commerically available for use in swimming pool water and should be used according to directions of the manufacturer to maintain the copper in a suspended state in the water.

In summary, an improved electro-chemical water purifier, its method of assembly and method of operation are disclosed which meet each of the above objectives. The novel design achieves these goals with a very limited number of inexpensive parts and lends itself to simple and rapid low-cost assembly.

THUS, it is apparent that in accordance with the present invention, a method and apparatus that fully satisfies the aims, advantages and objectives is set forth above. While the invention has been described in conjunction with specific embodiments, it is evident that many alterations, variations and modifications will become apparent to those skilled in the art in light of the foregoing description. Accordingly, it is intended that the present invention embrace all such alternative, modifications and variations as fall within the spirit and broad scope of the appended claims.

What is claimed as new and desired to be secured by Letters Patent of the United States is:

1. An apparatus for purifying swimming pool water and inhibiting the growth of algae therein, comprising:
   a substantially T-Shaped hollow pipe fitting having means defining first and second opposing openings and a central means defining a central opening substantially normal to said first and second openings, said first opening being suitable for receiving a flow of water and said second opening being suitable for discharging said flow of water;
   a plumbing pressure fitting coupled to and sealing said central opening;
   an electrical anode, consisting essentially of copper and having a first major axis, coupled to said pressure fitting and situated within said pipe fitting with said first major axis approximately normal to said flow of water;
   an electrical cathode means, said cathode consisting essentially of a metal with high iron content and having a second major axis, said cathode means disposed adjacent said anode with said second major axis approximately parallel to said first major axis;
   temperature sensing means for sensing the temperature of said water;
   temperature display means, coupled to said temperature sensing means, for displaying the temperature of said water;
   circuit means for applying an electrical current between said anode and said cathode means, said circuit means including a manual control for adjusting said current; and
   adjustment display means, coupled to said circuit means, for graphically displaying a first indicator of the level of said current and for graphically displaying a second indicator of a desirable level of said current, so that control of said current may be easily effected by adjusting the level of said current until the first and second indicators show the same reading.

2. The apparatus of claim 1, wherein said anode is cylindrical.

3. The apparatus of claim 2, wherein said cathode means is cylindrical having diameter substantially smaller than the diameter of said anode.

4. The apparatus of claim 3, wherein said cathode means further includes a plurality of rod members disposed about said anode.

5. The apparatus of claim 4, further including means electrically connecting said rod members together outside said pipe fitting.

6. The apparatus of claim 1, wherein said display means includes a bar graph.

7. The apparatus of claim 1, further including a female threaded portion of said central opening and a male threaded portion of said pressure fitting and wherein said pressure fitting is coupled to said pipe fitting by screwing said pressure fitting into said pipe fitting.

8. The apparatus of claim 1, wherein said anode has copper content of approximately 99.9 percent.

9. An apparatus for purifying swimming pool water and inhibiting the growth of algae therein, comprising:
- a substantially T-Shaped hollow pipe fitting having means defining first and second opposing openings and means defining a central opening substantially normal to said first and second openings, said first opening being suitable for receiving a flow of water and said second opening being suitable for discharging said flow of water;
- a plumbing pressure fitting coupled to and sealing said central opening by a screw connection;
- an electrical anode, having cylindrical shape and consisting of approximately 99.9% copper by weight and having a first major axis along the length of said cylindrical shape, coupled to said pressure fitting and situated within said pipe fitting with said first major axis approximately normal to said flow of water;
- an electrical cathode assembly of four rods composed of electro-zinc plated 1010 steel disposed symmetrically about said anode, each of said rods having a second major axis along its length, said cathode assembly disposed adjacent said anode with said second major axis approximately parallel to said first major axis;
- a controller circuit for applying an electrical current between said anode and said cathode assembly;
- a temperature sensor coupled to said anode;
- a first display for displaying the temperature sensed by said temperature sensor;
- a second display for displaying a figure of merit in graphical form relating to said current as a function of said temperature;
- adjustment means for permitting manual adjustment of said current; and
- a third display for displaying in graphical form a measure of said current for comparison with said figure of merit;
- whereby, proper current can be applied by adjusting said current until the third display has approximately the same graphical display as said second display.

10. An apparatus for purifying swimming pool water comprising:
- housing means including a water inlet means and a water outlet means suitable for coupling to a swimming pool filtration system, said inlet and said outlet being approximately diametrically opposed to allow water to flow in a path from said inlet to said outlet without change in water direction;
- an anode composed substantially of copper, said anode disposed within said path of water flow;
- a cathode disposed within said path of water flow;
- means for measuring temperature of said water;
- circuit means for converting said temperature to a first figure of merit and for graphically displaying said figure of merit; and
- a manually adjustable current source for allowing adjustment of current passing between said anode and said cathode and for graphically displaying a measure of said current in the same manner as said figure of merit is displayed.

11. The apparatus of claim 10, wherein said figure of merit and said current are displayed in the form of bar graphs, whereby, said current may be adjusted so that both of said bar graphs are equal in order to effect an appropriate setting of said current.

* * * * *